(No Model.)
H. C. BROWN.
WHIFFLETREE COUPLING.
No. 340,857. Patented Apr. 27, 1886.
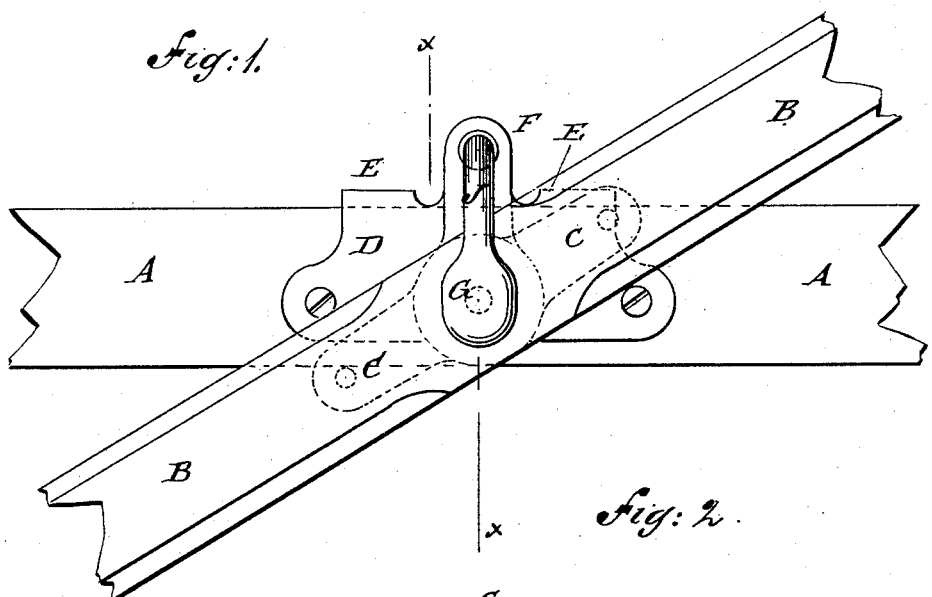
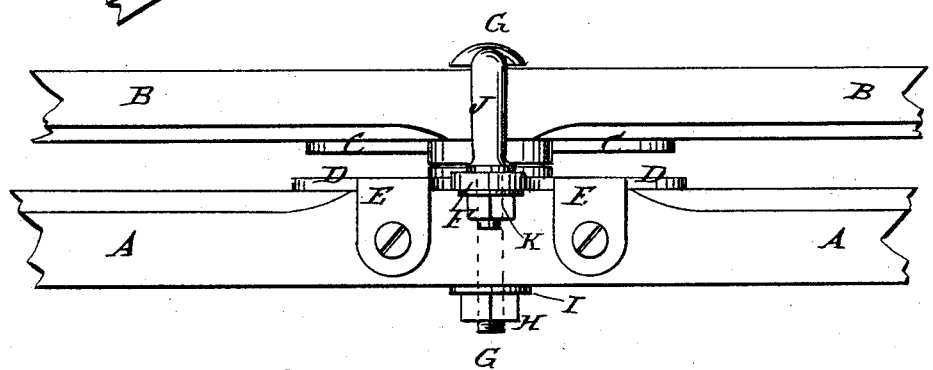
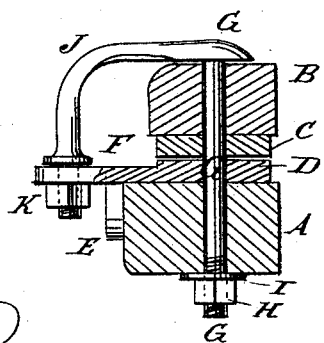
WITNESSES:
INVENTOR:
H. C. Brown
BY Munn & Co
ATTORNEYS.

UNITED STATES PATENT OFFICE.

HIRAM C. BROWN, OF WINSTED, CONNECTICUT.

WHIFFLETREE-COUPLING.

SPECIFICATION forming part of Letters Patent No. 340,857, dated April 27, 1886.

Application filed August 11, 1885. Serial No. 174,114. (No model.)

*To all whom it may concern:*

Be it known that I, HIRAM C. BROWN, of Winsted, in the county of Litchfield and State of Connecticut, have invented a new and useful Improvement in Whiffletree-Couplings, of which the following is a full, clear, and exact description.

Reference is to be had to the accompanying drawings, forming a part of this specification, and in which similar letters of reference indicate corresponding parts in all the figures.

Figure 1 is a plan view of my improved whiffletree-coupling shown as applied to a whiffletree and cross-bar, parts being broken away. Fig. 2 is a rear elevation of the same, and Fig. 3 is a sectional elevation of the same, taken through the line $x\,x$, Fig. 1.

The object of this invention is to provide couplings for connecting whiffletrees to the cross-bars of shafts, constructed in such a manner that the whiffletrees will be firmly supported and held from tilting forward, and which shall be simple in construction and inexpensive in manufacture.

The invention consists in the construction and combination of various parts of the whiffletree-coupling, as will be hereinafter fully described and then claimed.

A represents the cross bar of a pair of shafts, and B a whiffletree.

To the lower side of the whiffletree B is secured, by bolts, screws, or rivets, a plate, C, upon the middle part of which is a rise or boss to take the wear. The rise or boss of the plate C rests upon a corresponding rise or boss formed upon the plate D, which is secured to the cross-bar A by bolts, screws, or rivets. Upon the end parts of the rear edge of the plate D are formed lugs E, which are bent downward at right angles, so as to fit against the rear side of the cross-bar A, and are secured to the said cross-bar by bolts, screws, or rivets. Upon the middle part of the rear edge of the plate D is formed a lug, F, which projects to the rearward and is perforated, for the purpose hereinafter described.

The whiffletree B is pivoted to the cross-bar A by a bolt, G, which is kept in place by a nut, H, and is provided with a washer, I, to prevent the said nut from being loosened by friction between it and the said cross-bar A. Upon the head of the bolt G is formed an arm, J, which projects to the rearward, is curved downward, and is passed through the perforation in the lug F, where it is secured in place by a nut, K, screwed upon its lower end.

With this construction the connection between the whiffletree B and the cross-bar A will be made very strong, and the said whiffletree will be held securely from tilting forward when subjected to a draft, so that the said whiffletree will always work freely upon its bolt.

Having thus fully described my invention, I claim as new and desire to secure by Letters Patent—

1. A whiffletree-coupling consisting of a bolt having a curved arm formed on its head, and a plate provided with an apertured lug for the reception of the end of the curved arm, as set forth.

2. In a whiffletree-coupling, the combination, with the cross-bar A and the whiffletree B, of the plate D, secured to the cross-bar and provided with the apertured lug F, the bolt G, having the curved arm J formed on its head, and the nuts H K on the ends of the bolt and arm, respectively, substantially as herein shown and described.

HIRAM C. BROWN.

Witnesses:
GEORGE S. ROWE,
MILLS E. NORTON.